(12) United States Patent
Kachkova et al.

(10) Patent No.: US 10,299,010 B2
(45) Date of Patent: May 21, 2019

(54) METHOD OF DISPLAYING ADVERTISING DURING A VIDEO PAUSE

(71) Applicants: Valeria Kachkova, Minsk (BY); Aleh Chachotka, Minsk (BY); Vadim Kachkov, Minsk (BY)

(72) Inventors: Valeria Kachkova, Minsk (BY); Aleh Chachotka, Minsk (BY); Vadim Kachkov, Minsk (BY)

(*) Notice: Subject to any disclaimer, the term of this patent is extended or adjusted under 35 U.S.C. 154(b) by 0 days.

(21) Appl. No.: 15/468,206

(22) Filed: Mar. 24, 2017

(65) Prior Publication Data

US 2017/0289643 A1    Oct. 5, 2017

Related U.S. Application Data

(60) Provisional application No. 62/315,887, filed on Mar. 31, 2016.

(51) Int. Cl.

| H04N 21/81 | (2011.01) |
|---|---|
| H04N 21/431 | (2011.01) |
| H04N 21/44 | (2011.01) |
| H04N 21/442 | (2011.01) |
| H04N 21/61 | (2011.01) |
| H04N 21/84 | (2011.01) |
| H04N 21/472 | (2011.01) |
| H04N 21/6587 | (2011.01) |
| G06Q 30/02 | (2012.01) |

(52) U.S. Cl.
CPC ....... *H04N 21/812* (2013.01); *H04N 21/4312* (2013.01); *H04N 21/44008* (2013.01); *H04N 21/44204* (2013.01); *H04N 21/47217* (2013.01); *H04N 21/6125* (2013.01); *H04N 21/6587* (2013.01); *H04N 21/84* (2013.01); *G06Q 30/0277* (2013.01)

(58) Field of Classification Search
None
See application file for complete search history.

(56) References Cited

U.S. PATENT DOCUMENTS 6,473,858 B1 * 10/2002 Shimomura ........... H04N 7/152
                                                        348/E7.056
9,808,376 B2 * 11/2017 Boncyck .................. G06T 7/33
(Continued)

*Primary Examiner* — Mulugeta Mengesha
*Assistant Examiner* — Charles N Hicks
(74) *Attorney, Agent, or Firm* — Bardmesser Law Group

(57) ABSTRACT

A system and method for displaying information while watching videos and viewing still images. The user is provided additional information about objects in still images and videos; improving the information value of implicit advertising for the end user, increasing advertising efficiency; increasing monetization of videos and still images. The embodiment of the invention provides a system and method to equip videos and still images transmitted through an information network with additional information about the depicted objects. When the user activates a pause function while watching videos or is idle while viewing still images, a query is generated for the presence of objects in the frame with an information unit (advertisement). The query is analyzed at the information server. The result of the query is presented as an information (advertising) unit visually related to the information item.

19 Claims, 8 Drawing Sheets

(56) References Cited

U.S. PATENT DOCUMENTS

| | | | |
|---|---|---|---|
| 2009/0092374 A1* | 4/2009 | Kulas | H04N 7/173 386/248 |
| 2012/0189069 A1* | 7/2012 | Iannuzzelli | H04H 20/30 375/259 |
| 2013/0031582 A1* | 1/2013 | Tinsman | H04N 21/2353 725/36 |
| 2014/0255003 A1* | 9/2014 | Abramson | G06F 17/30247 386/240 |
| 2015/0268822 A1* | 9/2015 | Waggoner | G06F 3/04842 715/722 |

* cited by examiner

METHOD OF DISPLAYING ADVERTISING DURING A VIDEO PAUSE

CROSS REFERENCE TO RELATED APPLICATIONS

This application is a non-provisional of U.S. Provisional Patent Application No. 62/315,887, filed on Mar. 31, 2016, incorporated herein by reference in its entirety.

BACKGROUND OF THE INVENTION

Field of the Invention

The invention relates to server migration, and, more particular, to constructing a migration schema and migrating a server from one control panel to a different control panel.

Description of the Related Art

The rapid growth and development of information technology, an unprecedented increase in performance of computer systems, availability of cloud storage systems, and a rapid development of digital video technology made it possible to transmit high- and ultrahigh-definition digital videos to the end user via existing networks of cable, terrestrial, and satellite television, as well as the Internet. At the same time, advances in technology for advertising display while watching videos and television broadcasts via the Internet are not all that revolutionary. The main known methods of advertising display can be conditionally divided into the classic display of commercials during a broadcast, the display of implicit advertising and the display of advertising banners when watching videos on the Internet.

However, none of the methods is fully convenient for the end user. For example, a search for necessary goods in the case of implicit video advertising is much more complicated. When interested, the user faces difficulties when making a search query because there is no name of the advertising object, certain descriptive terms may be unknown, and understanding of search techniques of a specific search engine is required. All this affects the quality of search results, and the user obtains a set of web pages which may be unsuitable for a further purchase.

Various methods and interactive trade facilities are known that use a technique of linking advertising information with a visual story viewed by the consumer. In some of them, information units about goods and/or services offered for sale are constantly present in the screen margins when viewing videos, and their set is pre-defined and linked to time intervals of the video scenes, as in U.S. Pat. Nos. 9,124,950, 9,380,282. There is also a known possibility of pre-linking information units about goods and/or services offered for sale to pre-selected video scenes by assigning IDs to goods and/or services with the submission of these information units on the margins of the frame as in U.S. Pat. No. 9,277,157, or by assigning keywords to goods and/or services as in Russian patent No. 2495492.

Therefore, there is a need in the art to expand the usability and opportunities of advertising (information) display. A system that utilizes all features of modern means of video playback systems is proposed for this purpose.

SUMMARY OF THE INVENTION

The invention relates to displaying of advertising during pauses in watching by a user that substantially obviates one or more disadvantages of the related art.

The embodiment of the invention provides a system ensuring a possibility to obtain additional information about the objects present in the video or still images.

The provider of advertising information creates appropriate information units, assigns IDs to goods and/or services and puts the information blocks into the memory unit of the information server.

The user watches a video or views a still image. When idle or paused, the media player sends a query to the information server about the presence of information objects in the frame (in accordance with the previously assigned IDs). The information server processes the query, generates and sends the user a relevant information unit (if any). The media player shows the received information as linked information (advertising) units over the video or the still image. This is achieved through the use of specialized software that enables marking the information objects in still images and videos as well as analyzing visibility and motion of objects throughout the entire video. The same specialized software generates a database on the information server with data about the information objects in still images or videos.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

Figure 4:
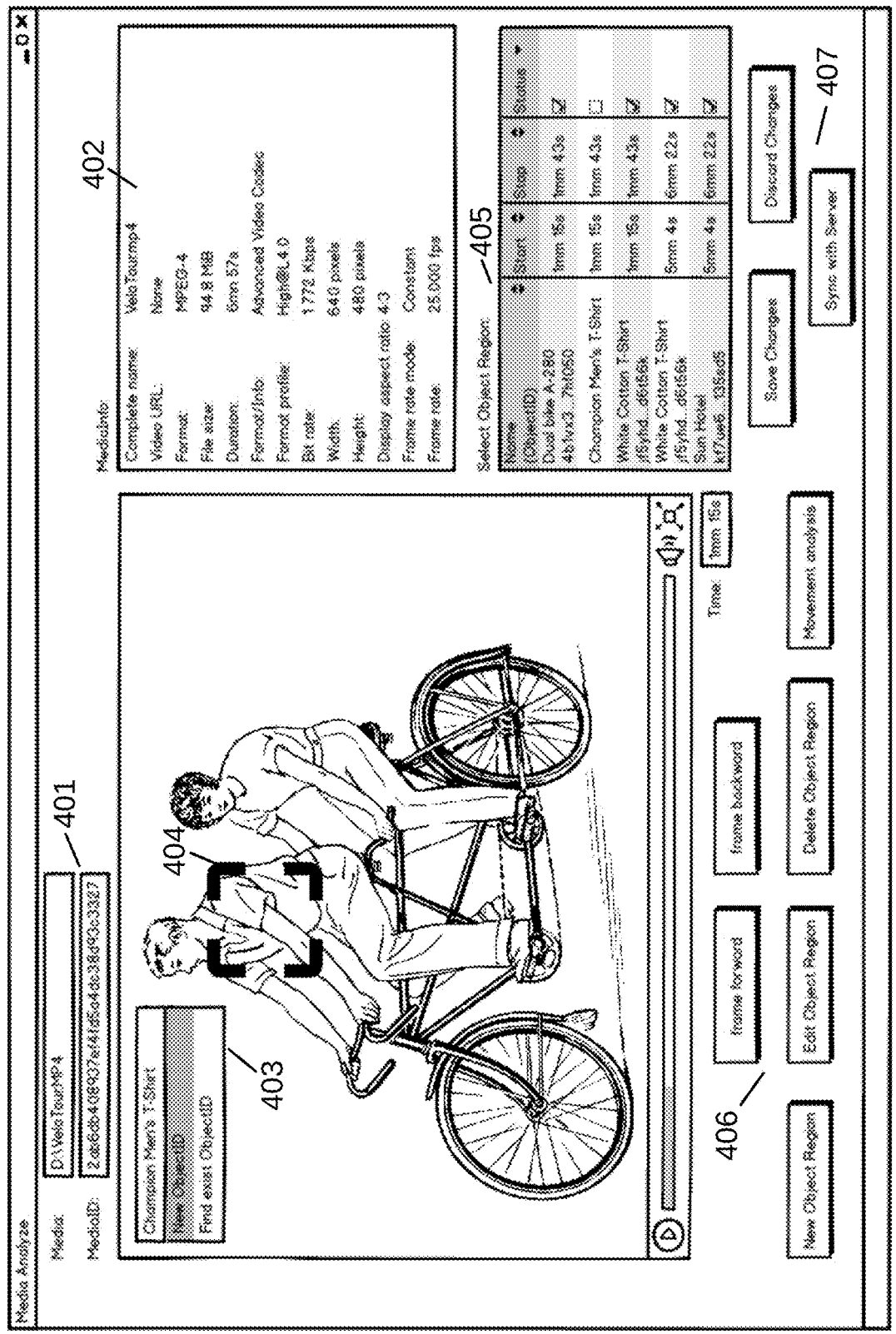

FIG. 4 illustrating a sketch, as an example, of a software interface for analysis of videos and still images.

Figure 5:
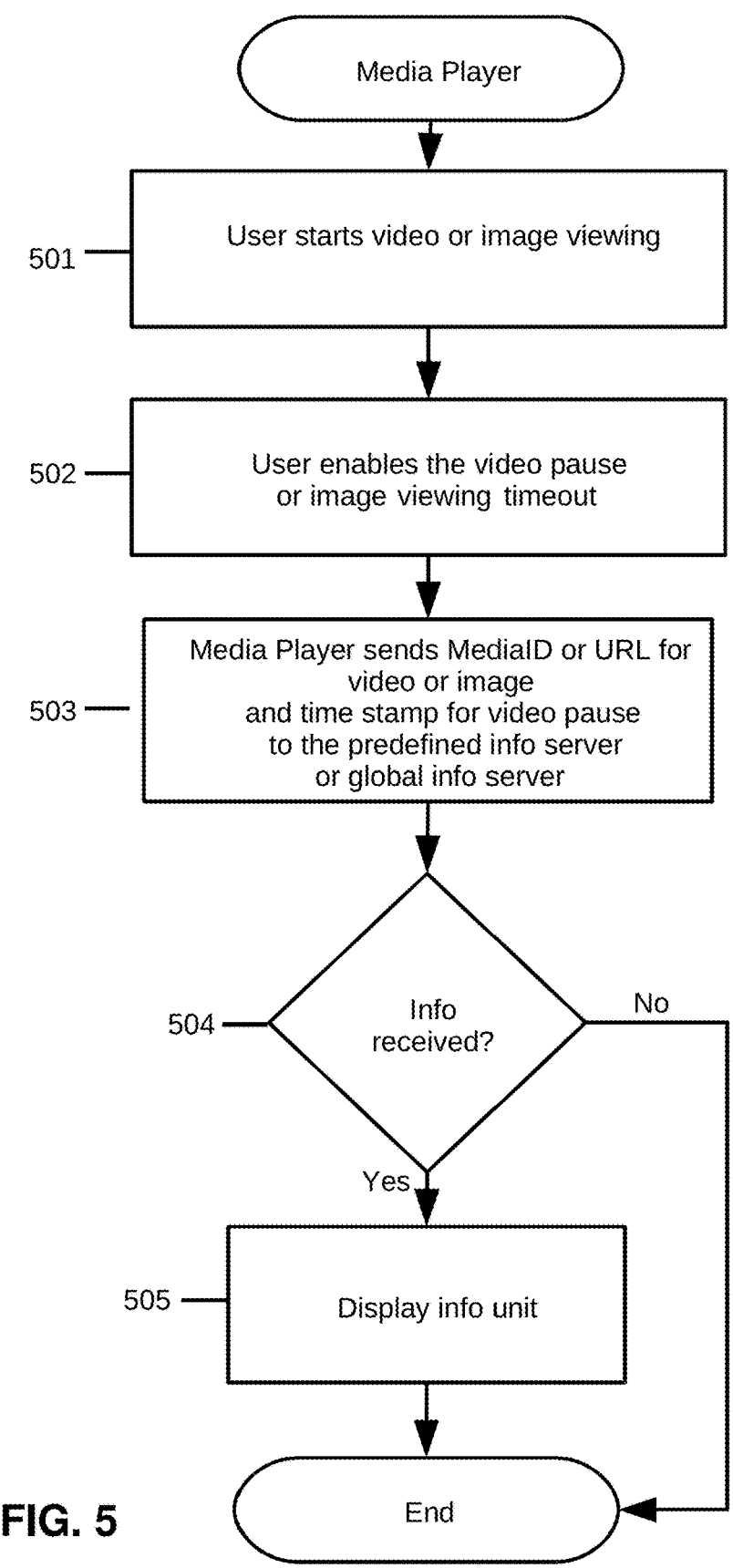

FIG. 5 illustrates a block diagram of the algorithm of output of an information unit.

Figure 6:
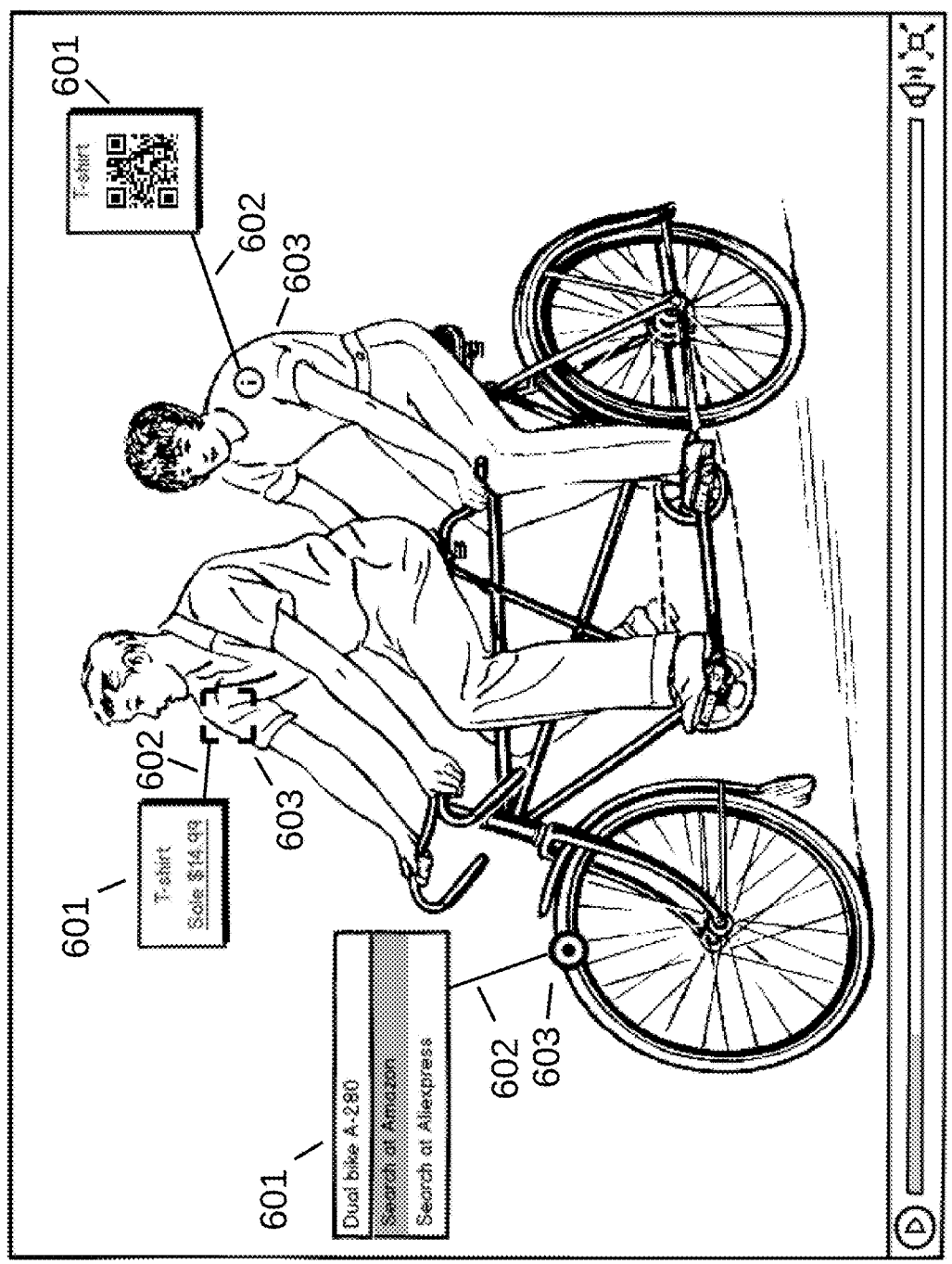

FIG. 6 illustrates a sketch, as an example, of a screen of a device for video playback during pause.

Figure 7:
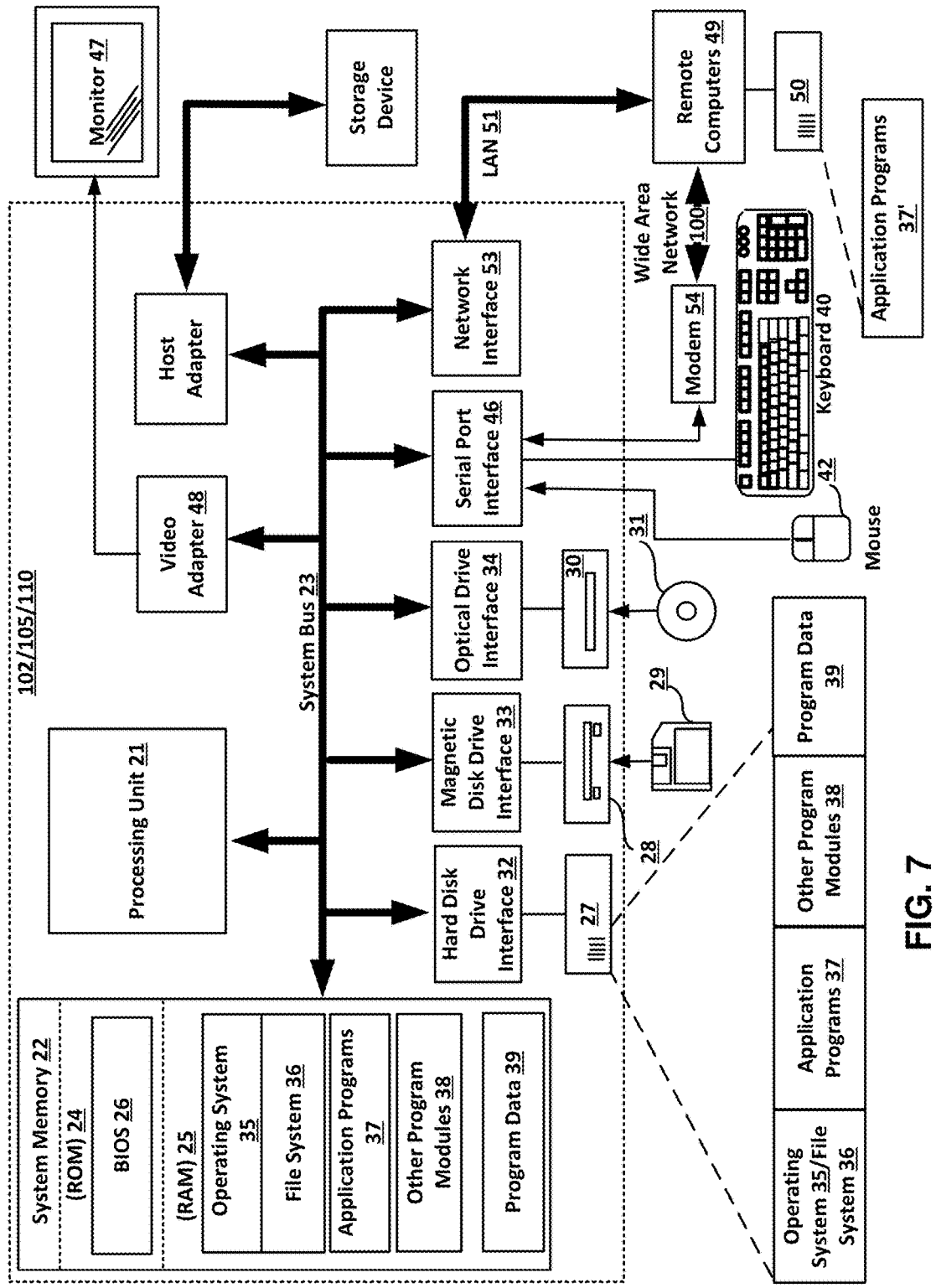

FIG. 7 shows an exemplary computer system or server for implementing the invention.

DETAILED DESCRIPTION OF THE PREFERRED EMBODIMENTS

Reference will now be made in detail to the preferred embodiments of the present invention, examples of which are illustrated in the accompanying drawings.

A system for providing the user with information about objects in videos or still images is based on and is implemented with the use of the existing technologies and standards. Structurally, it can be divided into three modules: the first one is specialized software for analysis of videos and still images, the second one is an information server, and the third one is a media player and a set of APIs to adapt third-party players. For interaction of the modules, a client-server architecture is used.

Figure 1A:
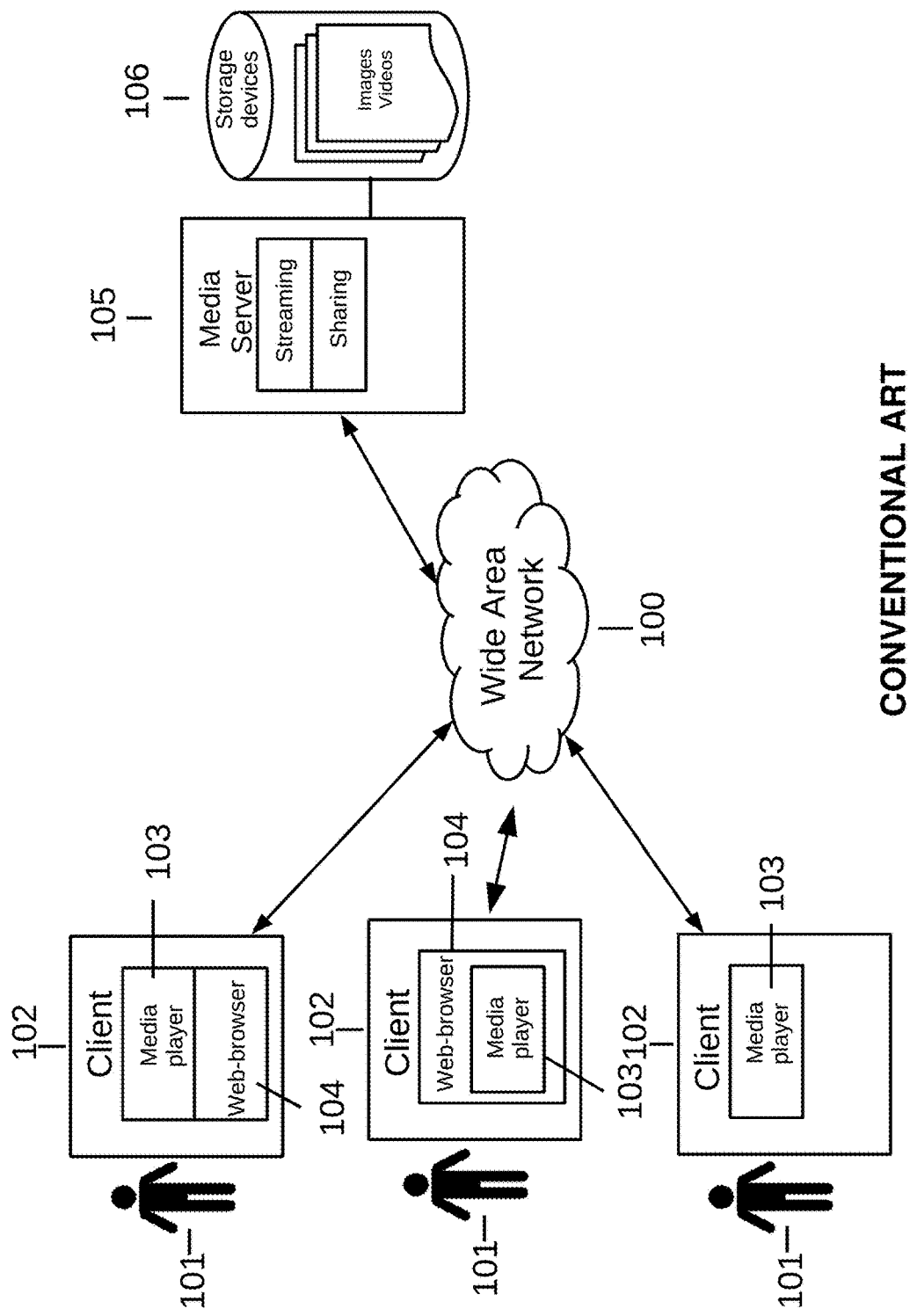
FIG. 1A illustrates a block diagram of the principle of operation client-server architecture.

FIG. 1A shows an arrangement of a conventional client-server architecture. Users (101) have a number of individual client devices (102) able to play videos and show still images on the screen or any other display device such as a computer, smartphone, tablet, set-top digital TV box, game console, smart TV, virtual reality device and other similar devices. Client devices (102) include media player (103) that can be standalone software or a part of web browser (104). Client devices (102) are designed with a possibility to connect to a media server (105) via a wide area network (100) such as the Internet or another form of a network for communication with the end user. Media server (105) may be implemented as a streaming server or a video hosting. The users (101) view videos or still images from storage device (106) of media server (105) using client devices (102).

Figure 1B:
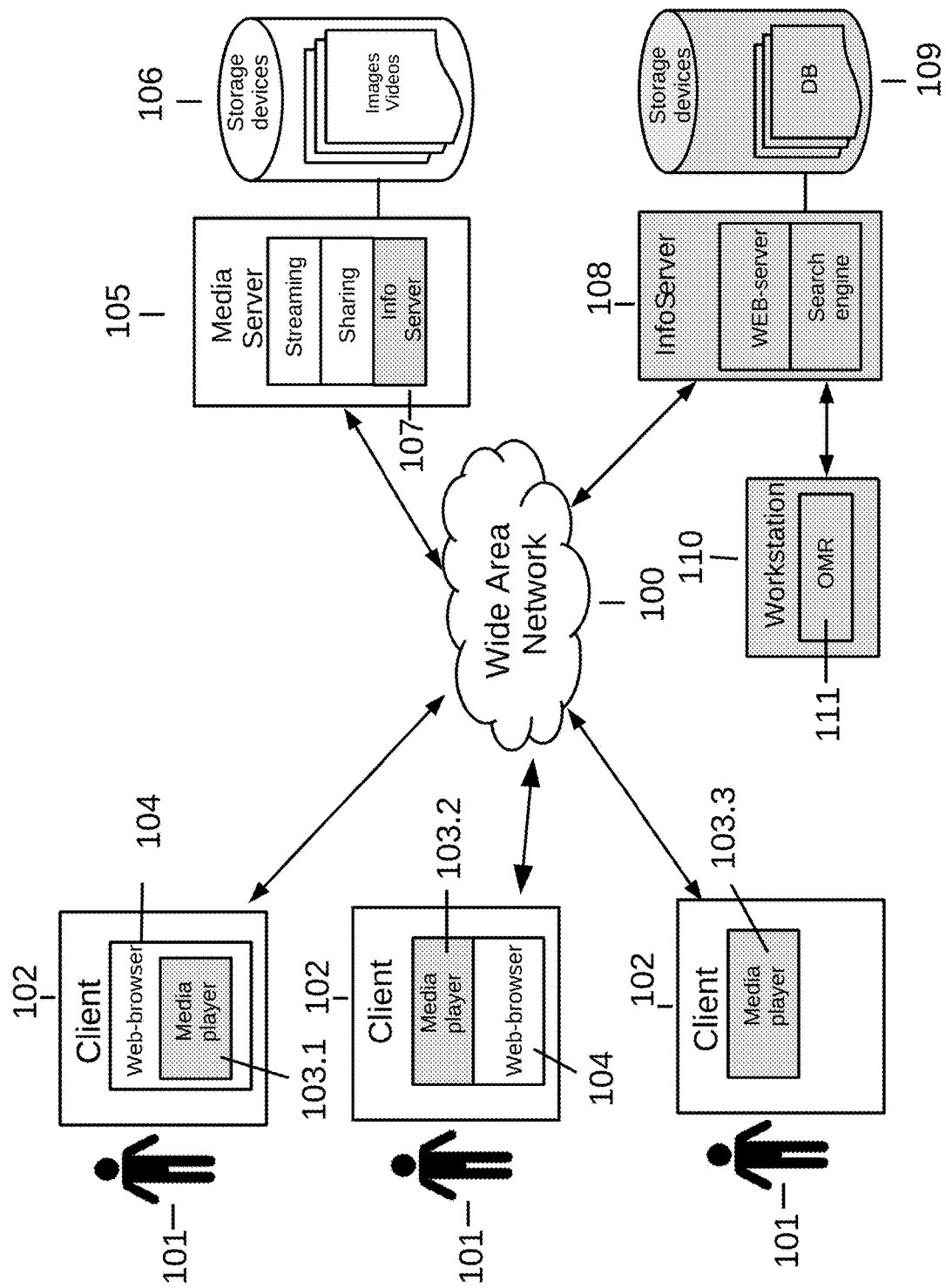
FIG. 1B illustrates a block diagram of a client-server architecture with the modules necessary to implement the invention.

FIG. 1B shows an arrangement of the client-server architecture with the modules necessary to implement the invention. In addition to the conventional architecture (see FIG. 1A), the following are added:

information server (107, 108) with database (109);

workstation (110) to run specialized Object Media Recognition software (111);

Additionally, the media player (103-103.1, 103.2, 103.3) is designed with a possibility to display information units.

Thus, the system includes a number of individual client devices (102) of users (101) designed with an ability to play videos and show still images on the screen or any other display device such as a computer, smartphone, tablet, set-top digital TV box, game console, smart TV, virtual reality device and other similar devices. Client devices (102) include a media player (103-103.1, 103.2, 103.3). The media player can be in any one of the following variations: as a framework or a plug-in (103.1) for the web browser (104) that is loaded before viewing video or still images from the web page of the media server (105), as an individual application (103.2) for the client device (102), if there is a web browser (104) in it, as an individual application (103.3) for the client device (102), if there is no web browser in it or it cannot be launched from the media player (103.3). Client devices (102) are designed with a possibility to connect to media server (105) via wide area network (100) such as the Internet or another form of a network for communication with the end user.

The media server (105) may be implemented as a streaming server or a video hosting. Users (101) view videos or still images from storage device (106) of the media server (105) using client devices (102). Client devices (102) are designed with an ability to connect to information server (107 or 108) via wide area network (100) such as the Internet or another form of a network for communication with the end user. The information server (108, 107) is designed with an ability to communicate with workstation (110) designed to run specialized Object Media Recognition software (111) and database (109).

The information server (107, 108) is an integrated software solution consisting of SQL relational database management system (109) or similar, a web server, such as Apache or similar, an interpreter for a web-oriented programming language such as PHP or Java, a search engine, a binary data parser or a data serialization format based on YAML or similar, and other necessary services. The information server can run on a dedicated physical server or in a cloud environment such as Microsoft Azure, Amazon Web Service, or similar, as well as to be a part of a media server. The database (109) of the information server (108) contains data on media objects of MediaID and information/advertising objects or ObjectID, their full and abbreviated names, classification, keywords, information or advertising materials, as well as related information. In addition, the information server database stores information about client devices, user actions, his/her geographic location based on the IP address, data about sending information or advertising units due to timeout when viewing still images or during a pause when playing videos, pause time, transitions of the user through information and advertising blocks, as well as the facts of video rewind or pause, during which the information or advertising object were in the frame. In the future, these data can be subjected to analysis and statistics for the advertiser, as well as to generate the most relevant information for the user. For convenient advertising and information campaigns, the information server has a WEB CMS (Content Management System) which is used to select a type of information unit for ObjectID, to change or to add the information object name, the links to the manufacturer's website, a bar code when available, and any other relevant information, to upload video, audio, photo and text advertising units for it into information server database (109), to select the regions to display information, to prioritize display of information units in case of multiple information units at one point of time, to receive analytical information.

There are two versions of the information server: a global information server (108) or a dedicated information server (107). A dedicated information server is an identical copy of the global information server (108), except that it runs on the customer's computing resources, for example on the media server (105) with subsequent service for only pre-configured media players (103) on the dedicated information server (107) and a limited list of media servers and resources installed by the customer.

Workstation (110) is a workplace to run specialized Object Media Recognition (OMR) software (111) for recognition and analysis of information objects in videos and still images with sending information to the information server. Preparation of videos or still images for subsequent display of information units is carried out by the operator using specialized OMR software. The operator can be a content creator, copyright holder, advertiser or owner of an information resource with videos or still images. An information unit means user-relevant information that helps identify an information object by the information object name, short description, availability in sale, opening time or availability of tickets for public facilities, as well as any other information that may be useful to the end user. At the same time, an information unit may contain advertising information as pre-edited text and/or graphic image and/or video clip.

Media player (103) is used to play videos or show still images with a possibility to provide information units during a pause when playing videos or timeout when viewing still images. Depending on the client type, the media player can be embedded into an HTML page and executed in a browser (103.1) for such client devices as a computer, a tablet, a smartphone. At the same time, the media player can be individual application (103.2, 103.3) both for mobile devices and for devices such as digital television set-top boxes, game consoles and other devices. When no browser is available or can run on a client device, the media player (103.3) displays information units as a QR code with the information object name. When the QR code is subsequently activated, the information is presented to the user as an HTML page on the information server. Any other media player can be modified to display information units using the attached documentation and APIs.

Before using the system as on FIG. 1B according to the claimed method, the provider of advertising information creates appropriate information units, assigns IDs to goods and/or services and puts the information units into memory unit (109) of information server (107 or 108).

Algorithm of Modules

Figure 2:
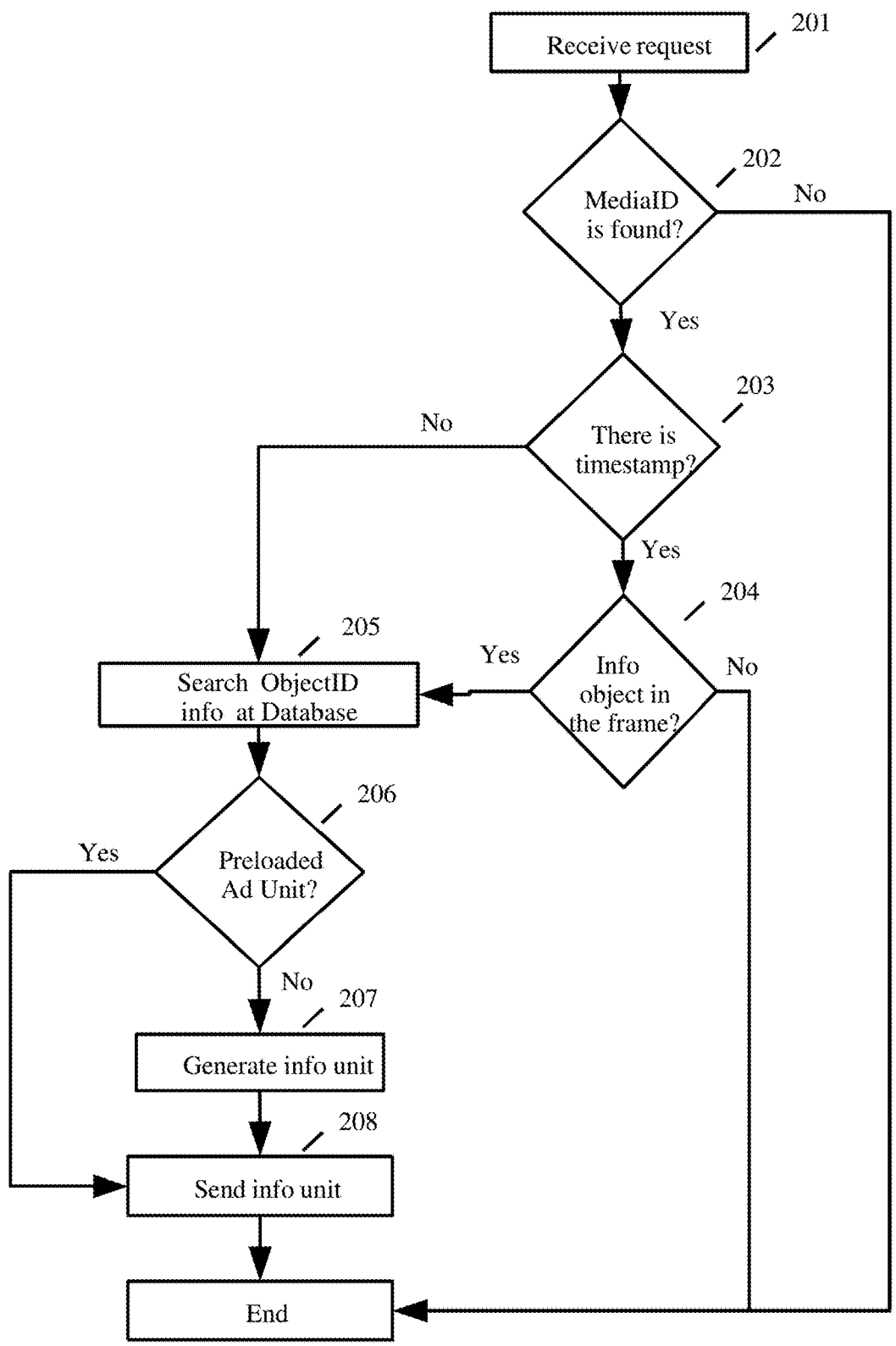
FIG. 2 illustrates a block diagram of the algorithm of sending an information unit.

The algorithm of information server (107, 108, 109) is shown in FIG. 2. The information server receives query (201) from the media player and checks for MediaIDs (202). The query (201) from the media player includes not only MediaID, timestamp or frame number, but also associated personal information about the user (101), his/her client (102) and related information (such as device type, OS, installed applications, etc.), media player (103) and any other possible information allowed by privacy settings in the media player (103). If a MediaID is found, then availability of a timestamp of pause in the query is checked (203). If a timestamp of pause is present in the query, the information server uses database (109) to check availability of information objects in the frame at the time of timestamp of pause (204). At the next stage, the information server searches for information (205) for ObjectID in the information server database. When pre-loaded advertising (information) units (206) are available, the information server sends them to media player (208). When no pre-loaded advertising (information) unit (206) is available, information server (207) generates an information unit most relevant to the user based on the data stored in information server database (109). The information server (108) generates the relevant information for the end user based on the user data, his/her client, geographic location and other information stored in its database (109), as well as generates queries to an internal or external search engine. The first time, the name of the object is only displayed on the screen in order to minimize the space occupied by the information or advertising unit for the convenience of the end user. The generated relevant information is available to the user in the form of a web page on the information server (108), which the user can view in the web browser by activating the information/advertising unit in the media player or by scanning a QR code. In case of repeated access to the information server (108) for the information/advertising unit on the basis of the information about the user's actions stored in the database (109) (for example, if the user repeatedly views the static image and the timeout is triggered; if the user repeatedly returns and activates a pause on the information/advertising object or activates a pause while the information/advertising object is repeatedly visible in the frame during the video), the information server modifies the information or advertising unit on the basis of already generated relevant information, adding the previously found relevant information (for example, the price of the information or advertising object, 2-3 nearest places where the user can purchase the object on the basis of his/her geographical location, working hours or tickets availability). The generated information unit is sent to media player (208). The information server sends the information unit to the media player as a binary. It includes the coordinates of the information object as a rectangle (x1, y1, x x2, y2) or as a circle (x, y, r); the predefined type of information unit, the name of the information object, associated text, graphic and video materials. The information unit can be sent using an open format of data serialization such as YAML or JSON.

Figure 3:
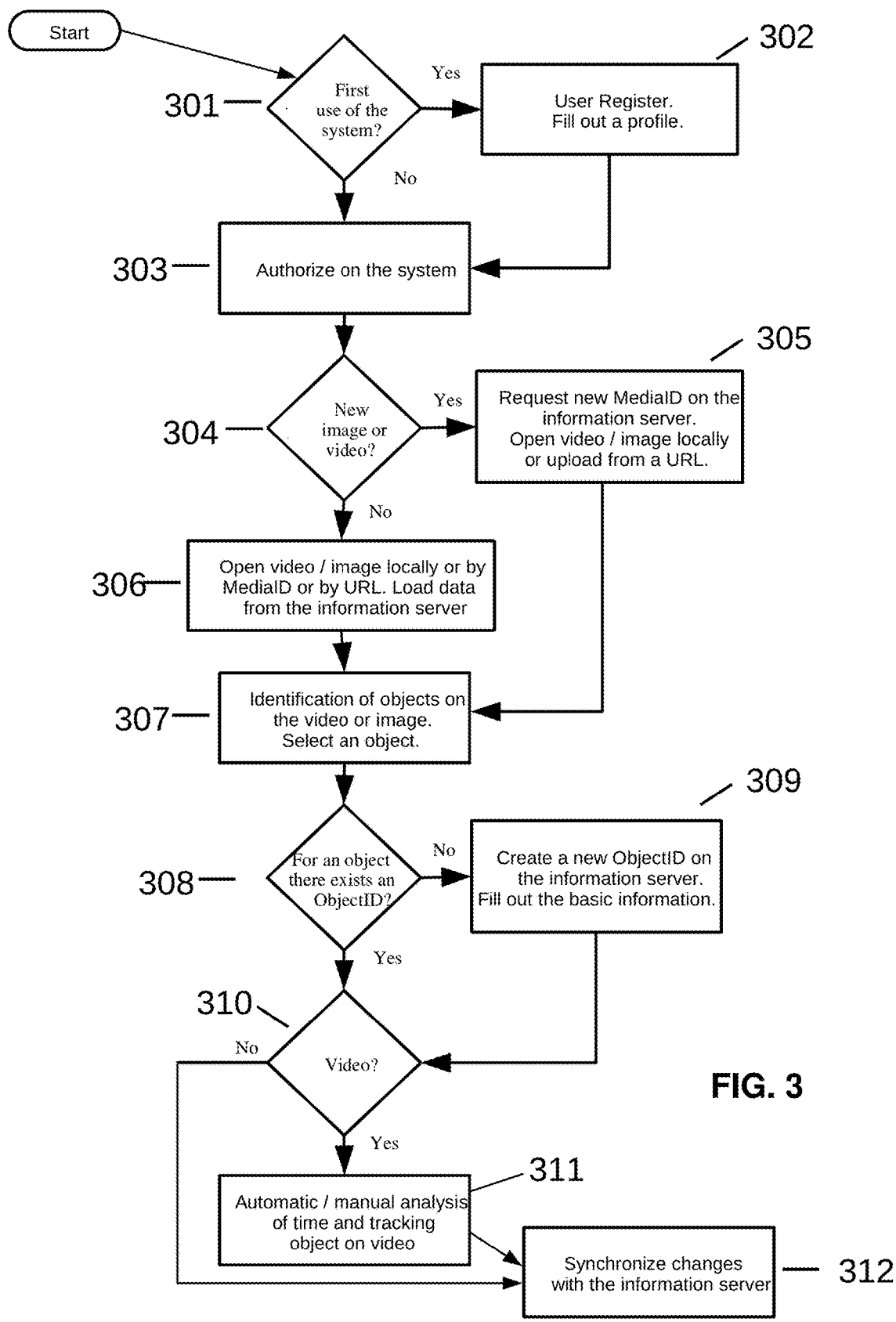
FIG. 3 illustrates a block diagram of the software for analysis of videos and still images.

FIG. 3 shows the algorithm of OMR (111). In the first step, the operator is prompted to sign in on the information server. To do that, it is necessary to enter the address of the dedicated information server or leave the default value to connect to the global information server. To enter username and password (301), the operator must first sign up at the website of the global information server and fill out profile (302), or specify existing username and password (303). In the case of dedicated information server (107), the operator must obtain a username and a password from the administrator of the dedicated information server. After successful authentication, the operator is prompted to create a new project or modify an existing project (304). Object Media Recognition for the new media object gets a unique MediaID number at information server (305). To edit an existing project, it is suggested to open a file from a local or network resource, or specify a URL to a media file located on a media server or another information resource, or open it by MediaID (306). In the case of a link to a remote file, OMR loads it into the workstation memory. When identifying information objects (307), an already existing information object can be used, which can be found by search or via ObjectID (308), or a new information object, which gets a new ObjectID at information server (309) after filling out the basic information. If OMR opens video (310), a capability is added to manually analyze movements of the information object in frame (311). In order to speed up the operator's work, the OMR functionality for automatic recognition of the motion of objects in the videos can be expanded with additional plug-in or third-party software. An exemplary listing of the result of the analysis of the video file in JSON format by OMR software is shown in Appendix i.

After successful identification of the information objects in the frame, it is possible to save the project on the workstation or synchronize the project with the information server (312).

FIG. 4 shows an example of the file analysis interface. The program displays the name of the file, its local path or URL, as well as MediaID received at information server (401). Features of the opened media file such as the file name, type, size, and other relevant information (402) are also displayed on the workstation screen. Using the control panel of ObjectID information objects (406), it is possible to specify a new object by selecting it with a rectangle or circle. After the operator has marked the information object in a still image, he can request a new unique ObjectID on the information server or select an existing ObjectID by searching by the information object name on the information server (403). For a video, the starting position is marked for motion analysis. After completion of automatic analysis, it is possible to edit the motion of the selected object step by step. The bookmarks bar with ObjectIDs allows selecting any information object added to the media file and then editing its location and status (405). When the selection of information objects is finished, the project can be saved (407). In this case, the OMR generates a binary file or a file in a YAML-based data serialization format such as JSON. The file contains a unique MediaID, filename, if available, its hash based on MD5 or SHA-1 or similar, URL, and ObjectID of the information object and its coordinates as a rectangle (x1, y1, x x2, y2) or a circle (x, y, r). For videos, information about the coordinates is complemented by a timestamp with subsequent recording of the coordinates and timestamp for all subsequent frames while the information object stays in the frame. For local files, MediaID is copied into the ImageUniqueID exif tag for still images or the VideoUniqueID tag for a media container such as MP4, MKV or others for videos. Upon completion, the data can be synchronized with the information server.

FIG. 5 shows the media player algorithm (see media players 103.1, 103.2, 103.3 in FIG. 1B). The user launches a media player to view videos or still images (step 501). The user activates the pause during video playback or a timeout is triggered when viewing a still image (step 502). The media player sends a query to the global information server or a predefined dedicated information server by sending binary data or by generating a special URL. The query contains a media file MediaID identifier or its URL, a timestamp of the video pause, and any other relevant information (step 503). If the media player receives an information unit in response from the information server (step step 504), then it is displayed on the screen using overlay (step 505).

For more clarity, the information object (see 602 in FIG. 6) can be highlighted by visually linking it to an advertising or information unit as shown in FIG. 6. The user can navigate to view additional information by activating the information unit using the interface provided by the device manufacturer. At the operator's decision, information units can appear in series with a pre-set delay to improve their perception by the user and provide emphasis on priority information objects.

FIG. 6 shows an example of a media player during the display of information units To improve the perception by the user, it is possible to use visual linking of information object (603) to information unit (601). The user can go to the information resources using web browser (104) on his/her client.

EXAMPLES OF IMPLEMENTATION

Example 1

The Metropolitan Art Museum decides to conduct an advertising campaign to increase museum attendance. To do this, the Metropolitan Art Museum uses a WEB CMS on the information server to create an information unit that contains basic information about the Museum and is linked to the homepage of the Museum, a unique ObjectID is assigned. Using OMR software, the Metropolitan Art Museum marks in the documentary located at Netflix a time range of the video dedicated to the Museum linking it with a unique ObjectID of the information unit. The documentary is assigned a unique MediaID, the information is synchronized with the information server database.

The user views a documentary about New York from Netflix on his/her laptop. The Metropolitan Art Museum gets into the frame. The user clicks on the pause.

The media player sends a query containing the MediaID of the video and a timestamp to the information server. In response, the media player receives an information unit from the information server with information about the Museum, its opening hours and address. The information unit is displayed on the laptop screen over the video. When clicking on the information unit, the user's browser opens the Museum's home page.

Example 2

Nike, the advertiser, wants to conduct an advertising campaign to increase sales of Nike Air Max 95 sneakers. To do this, Nike uses a WEB CMS on the information server to creates an information unit linked to the sneakers page of the Nike web store, a unique ObjectID is assigned, appropriate still images in social networks selected that show this model of sneakers. Each still image is assigned a unique MediaID using software OMR, the information is synchronized with the information server database.

The user views still images on social networks on his/her computer. One of the still images shows a man in Nike Air Max 95 sneakers. The user views a still image. After a preset 60-second timeout, the media player sends a query to the information server, which contains the unique ID of the still image. In response, the media player receives an information unit from the information server. The media player shows an information unit with the sneakers model name and a link to the sneakers page at the Nike web store.

Example 3 eBay, the advertiser, wants to increase the number of visitors of their website and uses a WEB CMS on the information server to create an information unit linked to the eBay information web page with basic information about the smartphone and service offers related to iPhone 5 (or the current model of the iPhone) sales by the auction users. A unique ObjectID is assigned, and YouTube videos with iPhone 5 are selected. Using OMR software, time periods where iPhone 5 is in the frame are marked in the videos, linking them to a unique information unit ObjectID. Each video is assigned a unique MediaID, the information is synchronized with the information server database.

The smart TV user uses the media player to watch Peter Hollens' music channel on YouTube. During the playback of the iPhone 5 VS Droid SONG video. the user clicks on pause at the time when iPhone 5 is in the frame. The media player sends a request containing a unique MediaID of the video, a timestamp and a smart TV tag to the information server; after receiving a response from the information server with a graphical QR code, the media player displays a visually linked QR code next to the iPhone 5 on the TV screen. If the user scans it from his/her mobile device, he/she will go to the web page of the eBay Internet auction site containing information about the phone, its full name, a link to the manufacturer's site, sale offers from its users, if any.

With reference to FIG. 7, an exemplary system for implementing the invention includes a general purpose computing device in the form of a host computer or a server 102/105/110 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the computer 102/105/110, such as during start-up, is stored in ROM 24.

The server 102/105/110 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the server 102/105/110. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., MICROSOFT WINDOWS, LINUX, APPLE OS X or similar). The server/computer 102/105/110 includes a file system 36 associated with or included within the operating system 35, such as the Windows NT™ File System (NTFS) or similar, one or more application programs 37, other program modules 38 and program data 39. A user may enter commands and information into the server 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

The server/computer 102/105/110 may operate in a networked environment using logical connections to one or more remote computers 49. The remote computer (or computers) 49 may be another personal computer, a server, a router, a network PC, a peer device or other common network node, and it typically includes some or all of the elements described above relative to the server 20, although here only a memory storage device 50 is illustrated. The logical connections include a local area network (LAN) 51 and a wide area network (WAN) 100. Such networking environments are common in offices, enterprise-wide computer networks, Intranets and the Internet.

In a LAN environment, the server/computer 102/105/110 is connected to the local network 51 through a network interface or adapter 53. When used in a WAN networking environment, the server/computer 102/105/110 typically connects also through a network interface or adapter 53 or other means for establishing communications over the wide area network 100, such as the Internet.

In a networked environment, the program modules depicted relative to the server 102/105/110, or portions thereof, may be stored in the remote memory storage device. It will be appreciated that the network connections shown are merely exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

APPENDIX i

Exemplary listing of the result of the analysis of the video file in JSON format by OMR software

```
{
    "summary": {
        "MediaID": "2ab6db408937ef4fd5a4dc38d93c3327",
        "SHA-1": "07ee47cd1689e1f4ce26760274e4e21859a22b5e",
        "type": "video",
        "MediaInfo": {
            "Title": "VeloTour.mp4",
            "FileFormat": "mp4",
            "FileSize": 13720851,
            "Duration": "00:06:57",
            "Summary": "Film Summary",
            "Url": "http://www.site.com/01/video/VeloTour.mp4",
            "Width": "640",
            "Height": "480",
            "Display aspect ratio": "4:3",
            "Frame rate mode": "Constant",
            "Frame rate": "25.000 fps"
        },
        "ObjectID": [
            {
                "ObjectID": "d829d82b2a0d6450c65b385fc756e1a1",
                "Summary": "Dual bike A-280",
                "Url": "http://www.site.com/bike",
                "TimeStamp": [
                    {
                        "T1": "00:00:20,00",
                        "T2": "00:00:23,400",
                        "coord": "(138,214,239,257)"
                    },
                    {
                        "T1": "00:00:20,00",
                        "T2": "00:00:23,400",
                        "coord": "(138,214,239,257)"
                    },
                    {
                        "T1": "00:00:20,00",
                        "T2": "00:00:23,400",
                        "coord": "(138,214,239,257)"
                    }
                ]
            },
            {
                "ObjectID": "d829d82b2a0d6450c65b385fc756e1a1",
                "Summary": "Champion Men's T-Shirt",
                "Url": "http://www.site.com/t-shirt",
                "TimeStamp": [
                    {
                        "T1": "00:00:20,00",
                        "T2": "00:00:23,400",
                        "coord": "(138,214,239,257)"
                    },
                    {
                        "T1": "00:00:20,00",
                        "T2": "00:00:23,400",
                        "coord": "(138,214,239,257)"
                    },
                    {
                        "T1": "00:00:20,00",
                        "T2": "00:00:23,400",
                        "coord": "(138,214,239,257)"
                    }
                ]
            }
        ]
    }
}
```

What is claimed is:

1. A computer-implemented method of displaying information during pauses while watching videos, the method comprising:
   placing labels about objects that are originally present in a video, into an information server database and assigning unique identification numbers to the objects in the videos, wherein the labels are added manually by creator or owner of the video;
   after manually identifying a start point of movement of the objects in the video, tracking the movement of the objects and automatically adding the previously manually added labels to the objects in other frames of the video;
   from a media player performing playback, querying an information server about the labels present in the frame, only when a user activates a pause;
   based on the manually added labels, generating advertising for the user at the information server by searching for relevant advertising and sending the relevant advertising to the media player; and
   only during the pause, displaying the advertising with the objects as a text and/or graphic image and/or a video clip on a display screen.

2. The method of claim 1, wherein the information server is connected to a workstation running Object Media Recognition (OMR) software to manually identify the products in the videos and to place the labels.

3. The method of claim 1, wherein the media player is a browser plug-in configured to interface to the media server.

4. The method of claim 3, wherein the media player is a stand-alone application configured to interface to the media server.

5. The method of claim 3, wherein the media server is a streaming server.

6. The method of claim 1, wherein the information server includes a database that stores the advertising and the manually added labels that correspond to the advertising.

7. The method of claim 6, wherein the database is an SQL relational database management system, a web server, an interpreter for a web-oriented programming language, a search engine, and a binary data parser or a data serialization format based on YAML.

8. The method of claim 6, wherein the database includes contains data on media objects that includes MediaID and ObjectIDs of the information objects, their full and abbreviated names, classification, keywords, and advertising materials.

9. The method of claim 8, wherein the information server receives a query from the media player and checks for MediaIDs, wherein the query includes the MediaID, timestamp or frame number, user information and information about a client device of the user.

10. The method of claim 8, wherein when the MediaID is found, then availability of a timestamp of pause in the query is checked, and, when a timestamp of pause is present in the query, the information server uses the database to check availability of objects in the frame at a time of timestamp of pause.

11. The method of claim 8, wherein, the information server searches for information for ObjectID in the database, and, when advertising is available, the information server sends the available advertising to the media player.

12. The method of claim 8, wherein the information server includes a web CMS (Content Management System) to select a type of advertising for the ObjectID, to change or to add any of the label, the links to a manufacturer's website, a bar code, to upload video, audio, photo and text advertising corresponding to the label into the database, to select the regions to display the advertising, and to prioritize display of advertising in case of multiple advertising clips.

13. The method of claim 6, wherein the database stores information about client devices, user actions, user geographic location based on an IP address, data about sending advertising during the pause when playing videos, pause time, transitions of the user through the advertising, and video rewind or pause, during which the information objects were in the frame.

14. The method of claim 1, wherein the information server includes a global information server and a dedicated information server representing an identical copy of the global information server that runs on the media server.

15. The method of claim 1, wherein the information server stores information that helps identify an object by object name, short description, availability on sale, opening time or availability of tickets for public facilities.

16. The method of claim 1, wherein the first time the object is found, only a name of the object is displayed.

17. The method of claim 1, wherein when the user repeatedly accesses the information server for the advertising, the information server modifies the advertising based on already generated relevant information, adding the previously found relevant information and sends the modified advertising to the media player.

18. The method of claim 2, wherein the OMR software-is used to manually identify the objects in the videos and to place the labels using a browser plug-in.

19. A computer-implemented method of displaying advertising during pauses while watching videos, the method comprising:
   placing product identifiers identifying products shown originally in a video into an advertising server database and assigning unique identification numbers to the products, wherein the product identifiers are added manually by creator or owner of the video;
   after manually identifying a start point of movement of the products in the video, tracking the movement of the products and automatically adding the previously manually added labels to the products in other frames of the video;
   from a media player performing playback, querying an information server about the product identifiers of the products present in the frame, and only when a user activates a pause;
   based on the manually added product identifiers, generating relevant advertising for the user at the information server by searching for the relevant advertising on the advertising server and sending the relevant advertising to the media player; and
   only during the pause, displaying the relevant advertising with the products as a text and/or graphic image and/or a video clip on a display screen.

* * * * *